(12) United States Patent
Iwata et al.

(10) Patent No.: US 7,557,589 B2
(45) Date of Patent: Jul. 7, 2009

(54) GAP DETECTION DEVICE FOR LASER BEAM MACHINE, LASER BEAM MACHINING SYSTEM AND GAP DETECTION METHOD FOR LASER BEAM MACHINE

(75) Inventors: Takaaki Iwata, Tokyo (JP); Hiroyoshi Omura, Tokyo (JP); Yoshihito Imai, Tokyo (JP); Teiji Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 476 days.

(21) Appl. No.: 11/554,707

(22) Filed: Oct. 31, 2006

(65) Prior Publication Data

US 2007/0284348 A1 Dec. 13, 2007

(30) Foreign Application Priority Data

Jun. 13, 2006 (JP) ............................. 2006-163185

(51) Int. Cl.
*G01R 27/26* (2006.01)
*B23K 9/06* (2006.01)
*B23K 9/00* (2006.01)

(52) U.S. Cl. ............... 324/662; 219/124.02; 219/121.36
(58) Field of Classification Search ................. 324/662; 219/124.02

See application file for complete search history.

(56) References Cited

U.S. PATENT DOCUMENTS

| | | | |
|---|---|---|---|
| 4,924,172 A | 5/1990 | Holmgren | |
| 5,195,045 A * | 3/1993 | Keane et al. | 702/107 |
| 5,315,259 A | 5/1994 | Jostlein | |
| 5,340,962 A * | 8/1994 | Schmidt et al. | 219/121.78 |
| 5,694,046 A * | 12/1997 | Hillerich et al. | 324/681 |
| 6,114,862 A * | 9/2000 | Tartagni et al. | 324/662 |
| 6,150,826 A | 11/2000 | Hokodate et al. | |
| 6,509,744 B1 | 1/2003 | Biermann et al. | |
| 7,186,943 B2 * | 3/2007 | Hoffman et al. | 219/121.36 |
| 7,335,851 B2 | 2/2008 | Iwata et al. | |
| 2003/0102294 A1 | 6/2003 | Kinbara et al. | |

FOREIGN PATENT DOCUMENTS

DE 10 2005 059 202 A1 12/2006
JP 2-83401 A 3/1990

(Continued)

*Primary Examiner*—Timothy J Dole
*Assistant Examiner*—Jeff Natalini
(74) *Attorney, Agent, or Firm*—Leydig, Voit & Mayer, Ltd.

(57) ABSTRACT

A signal processing portion obtains the reciprocal of a composite impedance of gap static capacitance and a plasma impedance, obtains composite static capacitance which is the sum of the gap static capacitance and a static capacitance component included in the plasma impedance from an imaginary part of the reciprocal, and obtains a resistance component included in the plasma impedance from a real part of the reciprocal. A gap detection device obtains the static capacitance component by using a model representing the characteristics of the reciprocal of the plasma impedance and the resistance component and obtains the gap static capacitance by subtracting the static capacitance component from the composite static capacitance. The gap detection device obtains a gap from the obtained gap static capacitance. Thus provided is a technique to detect a gap between a nozzle of a laser beam machine for outputting a laser beam and an object to be machined with high accuracy.

17 Claims, 10 Drawing Sheets

FOREIGN PATENT DOCUMENTS

| | | |
|---|---|---|
| JP | 4-356391 | 12/1992 |
| JP | 5-502948 A | 5/1993 |
| JP | 5-146879 A | 6/1993 |
| JP | 6-34311 A | 2/1994 |
| JP | 6-210476 A | 8/1994 |
| JP | 6-218569 A | 8/1994 |
| JP | 7-195188 A | 8/1995 |
| JP | 10-80780 A | 3/1998 |
| JP | 11-123573 A | 5/1999 |
| JP | 11-188492 A | 7/1999 |
| JP | 11-254161 A | 9/1999 |
| JP | 2000-176668 A | 6/2000 |
| JP | 2000-234903 | 8/2000 |
| WO | WO 92/06350 A1 | 4/1992 |

\* cited by examiner

F I G . 1
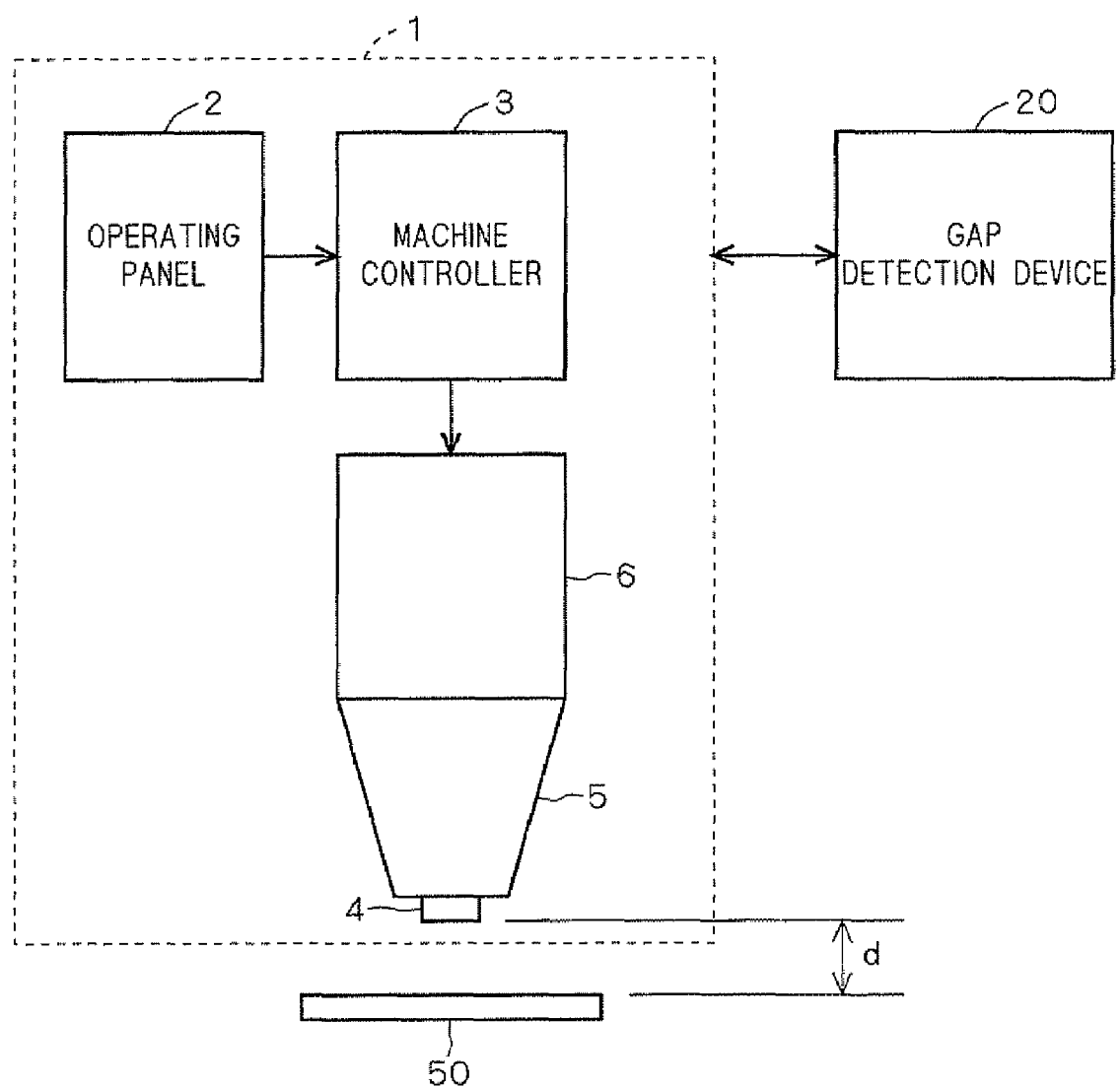

F I G . 8
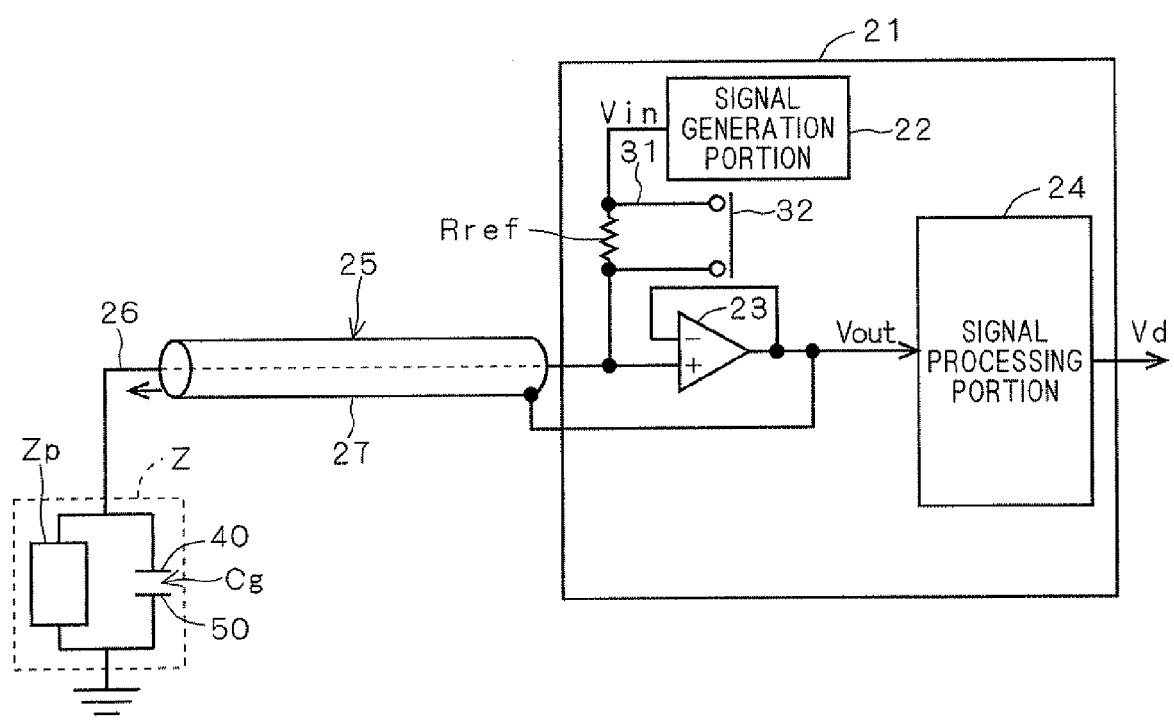

F I G . 1 2
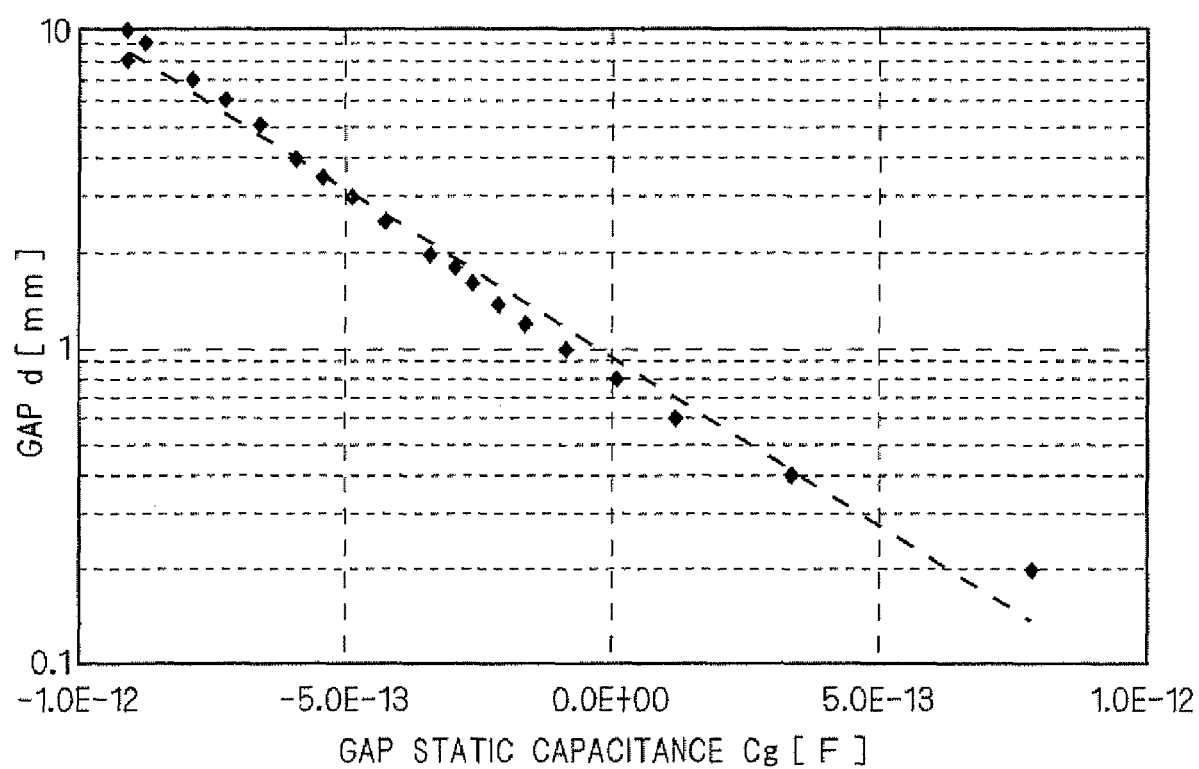

GAP DETECTION DEVICE FOR LASER BEAM MACHINE, LASER BEAM MACHINING SYSTEM AND GAP DETECTION METHOD FOR LASER BEAM MACHINE

BACKGROUND OF THE INVENTION

1. Field of the Invention

The present invention relates to a gap detection device for detecting a gap between a nozzle of a laser beam machine for outputting a laser beam and an object to be machined by using the laser beam, a gap detection method and a laser beam machining system.

2. Description of the Background Art

As to laser beam machining, various techniques have been proposed. Japanese Patent Application Laid-Open No. 2000-234903, for example, discloses a technique to detect a gap between a nozzle of a laser beam machine for outputting a laser beam and a work which is an object to be machined. Japanese Patent Application Laid-Open No. 4-356391(1992) discloses a technique to ensure stabilization of static capacitance between a nozzle and a work by reducing plasma generated during laser beam machining.

In the above Japanese Patent Application Laid-Open No. 2000-234903, the frequency of an input signal to a sensor electrode is selected so that the impedance due to the plasma generated during laser beam machining should be a pure resistance and the pure resistance is eliminated from the composite impedance of the impedance due to the gap between the nozzle and the work and the impedance due to the plasma generated during the laser beam machining, to reduce the effect of the plasma on detection of the gap. Even if the frequency of the input signal to the sensor electrode is carefully selected, however, since the impedance due to the plasma slightly includes a static capacitance component as well as the resistance component, the technique of Japanese Patent Application Laid-Open No. 2000-234903 can not completely eliminate the effect of the plasma on detection of the gap. Therefore, it is difficult to detect the gap between the nozzle and the work with high accuracy.

SUMMARY OF THE INVENTION

It is an object of the present invention to provide a technique to detect a gap between a nozzle of a laser beam machine for outputting a laser beam and an object to be machined with high accuracy.

The present invention is intended for a gap detection device for laser beam machine, for detecting a gap between a nozzle of a laser beam machine for outputting a laser beam and an object to be machined by using the laser beam. According to the present invention, the gap detection device for laser beam machine includes a composite admittance acquisition portion, a composite static capacitance acquisition portion, a resistance component acquisition portion, a static capacitance component acquisition portion, a gap static capacitance acquisition portion and a gap acquisition portion. The composite admittance acquisition portion obtains a composite admittance which is the reciprocal of a composite impedance of gap static capacitance depending on the gap and a plasma impedance depending on plasma generated during laser beam machining on the object. The composite static capacitance acquisition portion obtains composite static capacitance which is the sum of the gap static capacitance and a static capacitance component included in the plasma impedance from an imaginary part of the composite admittance. The resistance component acquisition portion obtains a resistance component included in the plasma impedance from a real part of the composite admittance. The static capacitance component acquisition portion obtains the static capacitance component by using a model representing a relation between the resistance component and the static capacitance component and the resistance component obtained by the resistance component acquisition portion. The gap static capacitance acquisition portion obtains the gap static capacitance by subtracting the static capacitance component from the composite static capacitance. The gap acquisition portion obtains the gap from the gap static capacitance obtained by the gap static capacitance acquisition portion.

The present invention is also intended for a laser beam machining system. According to the present invention, the laser beam machining system includes a laser beam machine having a nozzle for outputting a laser beam and a gap detection device for detecting a gap between an object to be machined by using the laser beam and the nozzle. The gap detection device includes a composite admittance acquisition portion, a composite static capacitance acquisition portion, a resistance component acquisition portion, a static capacitance component acquisition portion, a gap static capacitance acquisition portion and a gap acquisition portion. The composite admittance acquisition portion obtains a composite admittance which is the reciprocal of a composite impedance of gap static capacitance depending on the gap and a plasma impedance depending on plasma generated during laser beam machining on the object. The composite static capacitance acquisition portion obtains composite static capacitance which is the sum of the gap static capacitance and a static capacitance component included in the plasma impedance from an imaginary part of the composite admittance. The resistance component acquisition portion obtains a resistance component included in the plasma impedance from a real part of the composite admittance. The static capacitance component acquisition portion obtains the static capacitance component by using a model representing a relation between the resistance component and the static capacitance component and the resistance component obtained by the resistance component acquisition portion. The gap static capacitance acquisition portion obtains the gap static capacitance by subtracting the static capacitance component from the composite static capacitance. The gap acquisition portion obtains the gap from the gap static capacitance obtained by the gap static capacitance acquisition portion.

The present invention is further intended for a gap detection method for laser beam machine to detect a gap between a nozzle of a laser beam machine for outputting a laser beam and an object to be machined by using the laser beam. According to the present invention, the gap detection method includes the steps (a) to (f). The step (a) is to obtain a composite admittance which is the reciprocal of a composite impedance of gap static capacitance depending on the gap and a plasma impedance depending on plasma generated during laser beam machining on the object. The step (b) is to obtain composite static capacitance which is the sum of the gap static capacitance and a static capacitance component included in the plasma impedance from an imaginary part of the composite admittance. The step (c) is to obtain a resistance component included in the plasma impedance from a real part of the composite admittance. The step (d) is to obtain the static capacitance component by using a model representing a relation between the resistance component and the static capacitance component and the resistance component obtained in the step (c). The step (e) is to obtain the gap static capacitance by subtracting the static capacitance component from the composite static capacitance. The step (f) is to obtain the gap from the gap static capacitance.

In the present invention, since the gap between the nozzle and the object is obtained in consideration of not only the resistance component included in the plasma impedance but also the static capacitance component included it, it is possible to suppress the effect of the plasma generated during laser beam machining on detection of the gap. This makes it possible to detect the gap with high accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a constitution of a laser beam machining system in accordance with a first preferred embodiment of the present invention;

FIG. 8 is a view showing a constitution of a gap detection device in accordance with a third preferred embodiment of the present invention;

FIG. 12 is a graph showing a relation between gap static capacitance and a gap.

DESCRIPTION OF THE PREFERRED EMBODIMENTS

The First Preferred Embodiment

Figure 2:
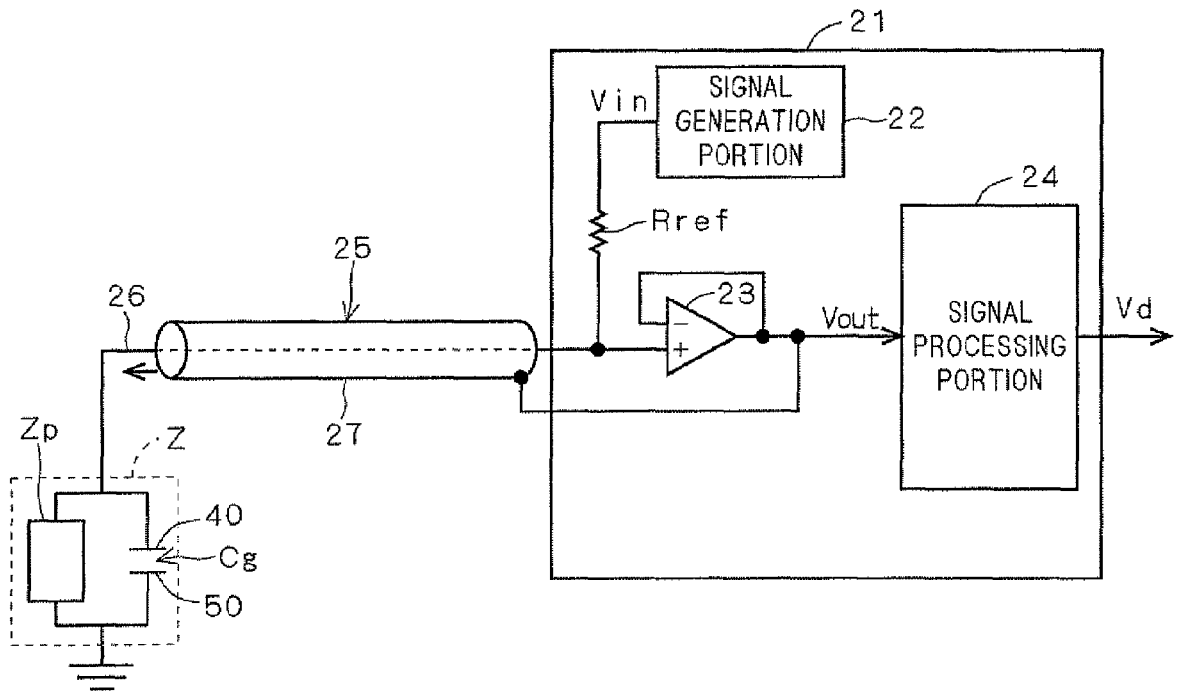
FIG. 2 is a view showing a constitution of a gap detection device in accordance with the first preferred embodiment of the present invention.

FIG. 1 is a view showing a constitution of a laser beam machining system in accordance with the first preferred embodiment of the present invention. As shown in FIG. 1, the laser beam machining system of the first preferred embodiment comprises a laser beam machine 1 for emitting a laser beam to a work 50, which is an object to be machined, such as a metal plate to machine the work 50 and a gap detection device 20 for measuring a gap d between a nozzle 4 of the laser beam machine 1, which will be described later, and the work 50.

The laser beam machine 1 comprises a operating panel 2 receiving an input of various information by a user. The user manipulates the operating panel 2 to input machining conditions such as a material or a thickness of the work 50 and the like to the laser beam machine 1. The laser beam machine 1 is provided with the nozzle 4 at a tip of a machining head 6, for outputting a laser beam, and provided with a guard electrode 5 around the nozzle 4 with an insulating material interposed therebetween. The laser beam machine 1 is further provided with a machine controller 3 for moving the machining head 6. The laser beam machine 1 machines the work 50 with the laser beam outputted from the nozzle 4 while moving the machining head 6 by the machine controller 3.

FIG. 2 is a view showing a constitution of the gap detection device 20. In laser beam machining on the work 50, it is necessary to appropriately control a gap d between the nozzle 4 for outputting the laser beam and the work 50 so that the focal length of the laser beam should reach a desired position in order to emit the laser beam to the work 50 with an optimum intensity. For this, the gap d must be detected with high accuracy. In the gap detection device 20 of the first preferred embodiment, it is possible to detect the gap d with high accuracy. The gap detection device 20 outputs the detected value of the gap d to the machine controller 3 of the laser beam machine 1. The machine controller 3 controls the machining head 6 on the basis of the received value of the gap d. With this, the gap d between the nozzle 4 and the work 50 is kept to be an appropriate value and the laser beam is emitted to the work 50 with an optimum intensity for laser beam machining.

As shown in FIG. 2, the gap detection device 20 comprises a gap detection device body 21 to which a center electrode cable 26 and a guard electrode cable 27 are mounted. The gap detection device body 21 comprises a signal generation portion 22 for generating an input signal Vin and outputting the signal, a buffer circuit 23 receiving the input signal Vin and outputting the signal, a signal processing portion 24 for obtaining the gap d on the basis of an output signal Vout from the buffer circuit 23, and a reference resistance Rref. The input signal Vin is an alternating signal such as a sine wave or a triangular wave. An output terminal of the signal generation portion 22 is connected to one end of the reference resistance Rref. The buffer circuit 23 is formed of e.g., an operational amplifier. A positive (plus) input terminal of the operational amplifier is connected to the other end of the reference resistance Rref and a negative (minus) input terminal is connected to an output terminal of the operational amplifier. In other words, the operational amplifier serves as a voltage follower circuit, which receives a signal of the other end of the reference resistance Rref and outputs the signal as it is to the signal processing portion 24 as the output signal Vout.

The other end of the reference resistance Rref is connected to a center electrode 40 in the laser beam machine 1 with the center electrode cable 26. In this preferred embodiment, the nozzle 4 serves as the center electrode 40. The center electrode 40 and the work 50 serves as a capacitor, forming gap static capacitance Cg which depends on the gap d. Therefore, when the gap d varies, the gap static capacitance Cg varies. The signal processing portion 24 of the gap detection device body 21 obtains the gap static capacitance Cg and further obtains the gap d from the obtained gap static capacitance Cg. In this preferred embodiment, though the nozzle 4 serves as the center electrode 40, the center electrode 40 whose distance from the work 50 varies in accordance with the gap d may be provided near the nozzle 4 to face the work 50, separately from the nozzle 4.

In this case, if the laser beam machining is performed with the nozzle 4 and the work 50 moved relatively, there occurs plasma between the nozzle 4 and the work 50 in accordance with the machining conditions. This plasma so acts as to form an impedance Zp between the center electrode 40 and the work 50. In other words, between the center electrode 40 and the work 50, the impedance Zp Thereinafter, referred to as "plasma impedance Zp") depending on this plasma is formed. Therefore, it can be thought that during the laser beam machining, between the center electrode 40 and the work 50, the gap static capacitance Cg and the plasma impedance Zp which are connected in parallel to each other should be formed and the reference resistance Rref is electrically connected to a composite impedance Z of the gap static capacitance Cg and the plasma impedance Zp. Since the work 50 is grounded during the laser beam machining, the reference resistance Rref and the composite impedance Z are electrically connected in series to each other between the output terminal of the signal generation portion 22 and a ground voltage. Therefore, the input signal Vin, being divided, is inputted to the buffer circuit 23 which is connected to the other end of the reference resistance Rref and a divided voltage signal of the input signal Vin is outputted from the buffer circuit 23.

The guard electrode cable 27 is connected to the guard electrode 5 in the laser beam machine 1. The output terminal of the buffer circuit 23 is connected to the guard electrode cable 27. Therefore, the voltage of the center electrode cable 26 and that of the guard electrode cable 27 are almost equal to each other. In this preferred embodiment, the center electrode cable 26 and the guard electrode cable 27 constitute a concentric cable 25, and the center conductor of the concentric cable 25 is the center electrode cable 26 and an outer conductor surrounding the center conductor is the guard electrode cable 27. Accordingly, voltages of the center conductor and the outer conductor of the concentric cable 25 are almost equal. It is therefore possible to reduce the effect of stray capacitance in the cable connecting the gap detection device body 21 and the laser beam machine 1 on detection of the gap d.

Figure 3:
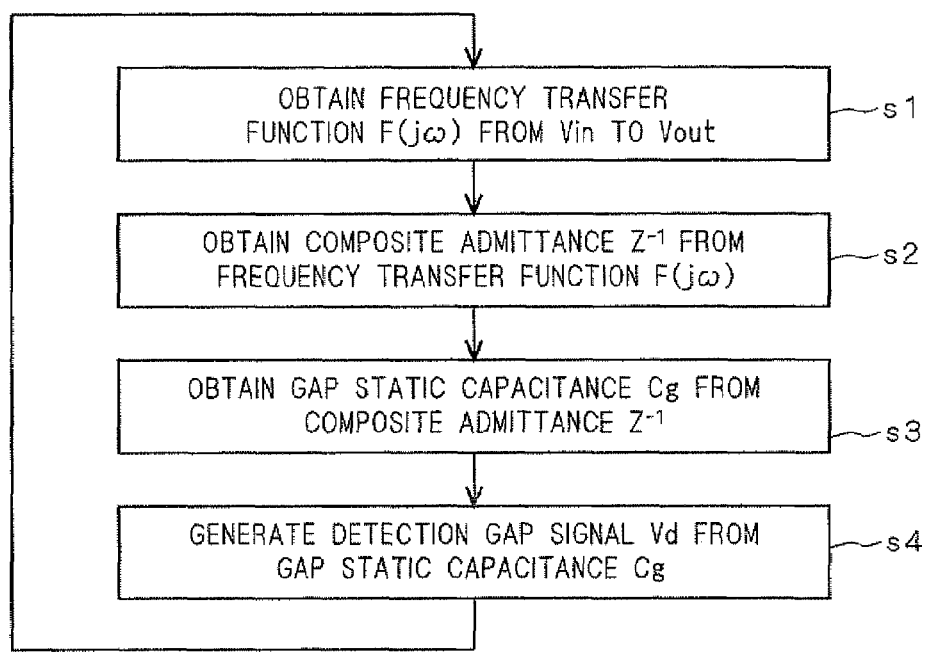
FIG. 3 is a flowchart showing a gap detection method in accordance with the first preferred embodiment of the present invention.

Next, a method of detecting the gap d by the signal processing portion 24 will be discussed in detail. FIG. 3 is a flowchart showing a gap detection method in accordance with the first preferred embodiment. As shown in FIG. 3, first in Step s1, the signal processing portion 24 obtains a transfer function F(s) from the input signal Vin to the output signal Vout. Reference sign F(jω) which is obtained by substituting s=jω (where j represents an imaginary unit and ω represents an angular frequency) into the transfer function F(s) represents a frequency transfer function. In this preferred embodiment, the information on the input signal Vin is stored in the signal processing portion 24 in advance. The signal processing portion 24 samples the output signal Vout outputted from the buffer circuit 23 and obtains the transfer function F(s) on the basis of the data obtained by sampling the output signal Vout and the data on the input signal Vin which is stored in advance. In Step s1, it is not necessary to obtain the transfer function F(s) for all the frequency areas but the frequency transfer function F(jω) with at least one angular frequency ω has to be obtained. Since the transfer function F(s) is obtained in order to obtain the gap static capacitance Cg, however, it is necessary to obtain a value of the transfer function F(s) in a high frequency area to some degree, in consideration of the sensitivity of the gap static capacitance Cg with respect to the variation of the gap d. In this preferred embodiment, the frequency transfer function F(jω) in a frequency area of several tens kHz or higher is obtained. In order to obtain such a frequency transfer function, a sampling frequency with respect to the output signal Vout is set to be a sufficiently high value in the signal processing portion 24, and the signal generation portion 22 generates such an input signal Vin as to include a component in this frequency area.

Next in Step s2, the signal processing portion 24 obtains a composite admittance $Z^{-1}$ which is the reciprocal of the composite impedance Z from the transfer function F(s) which is obtained in Step s1. In other words, the signal processing portion 24 serves as a composite admittance acquisition portion for obtaining the composite admittance $Z^{-1}$. Also in this step, it is not necessary to obtain the composite admittance $Z^{-1}$ in all the frequency areas but the composite admittance $Z^{-1}$ in at least one frequency has to be obtained.

Herein, assuming that a system from the output of the signal generation portion 22 to the output of the buffer circuit 23 is regarded as an electric circuit, the transfer function F(s) from the input signal Vin to the output signal Vout is expressed by using a mathematical model of the following equation (1):

$$F(s) = \frac{Vout(s)}{Vin(s)} = \frac{A(s)}{1 + Rref\left(\frac{1}{Z(s)} + \frac{1}{X(s)}\right)} \quad \text{(Eq. 1)}$$

In the equation (1), reference signs A(s) and X(s) are parameters which depend on the kinds of the buffer circuit 23 and the concentric cable 25 which are actually used and the characteristics of a substrate on which the reference resistance Rref and the buffer circuit 23 are formed. Reference signs Vin(s), Vout(s) and Z(s) represent the input signal Vin, the output signal Vout and the composite impedance Z, respectively. In this preferred embodiment, the values of the parameters A(s) and X(s) are stored in the signal processing portion 24 in advance. As to the values of these parameters A(s) and X(s), only the values in the frequency which is actually used have to be obtained, like the transfer function F(s) obtained in Step s1.

In the above equation (1), both the composite impedance Z(s) and the parameter X(s) are present as a form of reciprocal. As will be clear from the following discussion, 10 handling the composite impedance Z(s) and the parameter X(s) as a form of reciprocal has various advantages and some conveniences. This is the reason why the composite admittance $Z(s)^{-1}$ which is the reciprocal of the composite impedance Z(s) is obtained in Step s2.

By substituting jω into s in the equation (1), the following equation (2) will be obtained:

$$F(j\omega) = \frac{A(j\omega)}{1 + Rref(Z(j\omega)^{-1} + X(j\omega)^{-1})} \quad \text{(Eq. 2)}$$

Then, in order to obtain the composite admittance $Z(j\omega)^{-1}$ in the frequency from the frequency transfer function F(jω), the equation (2) is transformed as follows:

$$Z(j\omega)^{-1} = \left(\frac{A(j\omega)}{F(j\omega)} - 1\right)\frac{1}{Rref} - X(j\omega)^{-1} \quad \text{(Eq. 3)}$$

In Step s2, the signal processing portion 24 obtains the composite admittance $Z(j\omega)^{-1}$ by substituting the value of the frequency transfer function F(jω) which is obtained in Step s1, the values of the parameters A(jω) and X(jω) and the value of the reference resistance Rref into the equation (3). The value of the reference resistance Rref is stored in the signal processing portion 24 in advance.

Next in Step s3, the signal processing portion 24 obtains the gap static capacitance Cg from the composite admittance $Z(j\omega)^{-1}$ which is obtained in Step s2. Before discussing the operation of Step s3, the characteristics of plasma generated during the laser beam machining will be discussed.

The composite admittance $Z(j\omega)^{-1}$ can be expressed as the following equation (4) by using the gap static capacitance Cg and a plasma admittance $Zp(j\omega)^{-1}$ which is the reciprocal of the plasma impedance $Zp(j\omega)$:

$$Z(j\omega)^{-1} = Zp(j\omega)^{-1} + j\omega Cg \quad \text{(Eq. 4)}$$

Since the plasma admittance $Zp(j\omega)$ can be thought as the composite impedance in a circuit in which the resistance component Rp and the static capacitance component Cp are connected in parallel to each other, the equation (4) can be transformed to the following equation (5):

$$Z(j\omega)^{-1} = \left(\frac{1}{Rp} + j\omega Cp\right) + j\omega Cg \quad \text{(Eq. 5)}$$

$$= \frac{1}{Rp} + j\omega(Cg + Cp)$$

Assuming that Rp=R and Cg+Cp=C, the equation (5) can be transformed to the following equation (6):

$$Z(j\omega)^{-1} = \frac{1}{Rp} + j\omega(Cg + Cp) = \frac{1}{R} + j\omega C \quad \text{(Eq. 6)}$$

where 1/R is a real part and $\omega C$ is an imaginary part.

Thus, the composite admittance $Z(j\omega)^{-1}$ can be thought as the reciprocal of the composite impedance in the circuit in which a resistance element having a resistance value R and a capacitor having capacitance C are connected in parallel to each other.

Since the composite admittance $Z(j\omega)^{-1}$ which is obtained in Step s2 is a complex number, as expressed by the equation (6), it can be separated into a real part $R^{-1}$ and an imaginary part $\omega C$. Then, by plotting the composite admittance $Z(j\omega)^{-1}$ which is obtained in Step s2 in a $R^{-1}$-C plane where the horizontal axis represents the real part $R^{-1}$ and the vertical axis represents a value C obtained by dividing the imaginary part $\omega C$ by the angular frequency $\omega$, the characteristics of the plasma generated during the laser beam machining can be analyzed. Also by plotting the composite admittance $Z(j\omega)^{-1}$ in a complex plane where the horizontal axis is a real axis and the vertical axis is an imaginary axis, the characteristics of the plasma generated during the laser beam machining can be analyzed.

Figure 4:
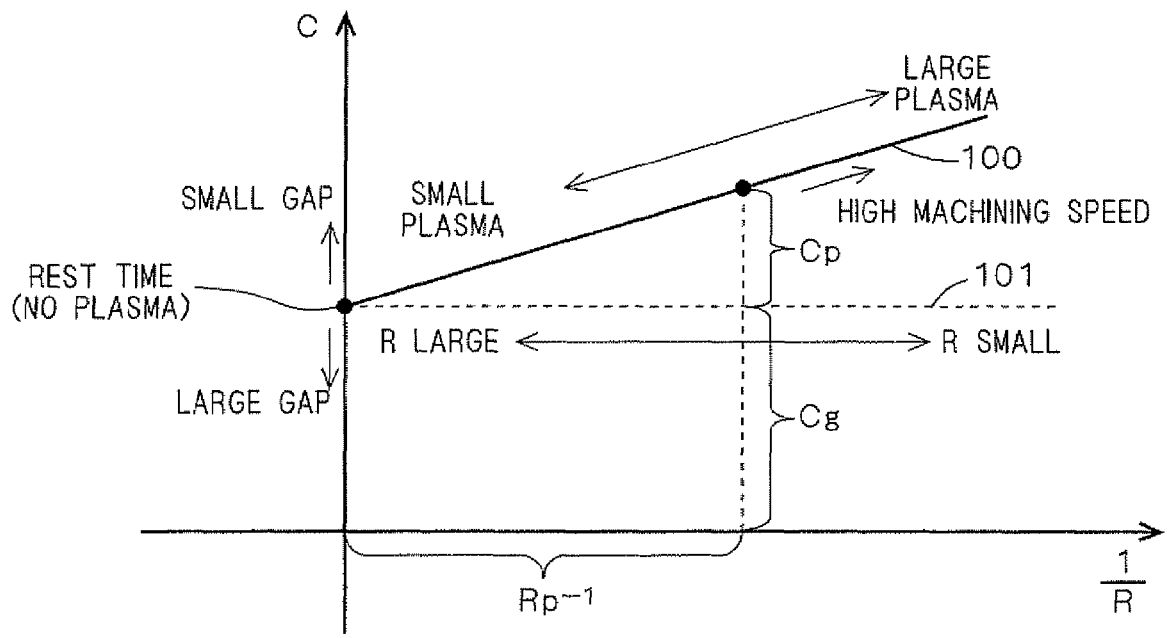
FIG. 4 is a graph showing the characteristics of composite admittance.

FIG. 4 is a graph showing the $R^{-1}$-C plane where the composite admittance $Z(j\omega)^{-1}$ is plotted. In FIG. 4, the solid line 100 represents the characteristics of the composite admittance $Z(j\omega)^{-1}$ in a case where the machining speed gradually increases with the gap d kept constant. In FIG. 4, for reference purposes, the characteristics of the composite admittance $Z(j\omega)^{-1}$ are indicated by the broken line 101 in a case where a resistance element is actually inserted between the nozzle 4 which is kept still with emission of laser beam stopped and the work 50 and the resistance value of the resistance element, instead of the plasma impedance, varies with the gap d kept constant.

From the solid line 100 and the broken line 101 of FIG. 4, it can be understood that the characteristics of the composite admittance $Z(j\omega)^{-1}$ show different behaviors between the case where there occurs plasma between the nozzle 4 and the work 50 and the case where the resistance element is inserted between the nozzle 4 and the work 50. Therefore, also from this result, it can be understood that the plasma generated between the nozzle 4 and the work 50 does not work as a pure resistance and the plasma impedance $Zp(j\omega)$ includes a static capacitance component.

As indicated by the solid line 100, as the machining speed increases, in other words, as the intensity of the plasma which is generated increases, both the value of 1/R and the value of C increase and the characteristic of the composite admittance $Z(j\omega)^{-1}$ shown in the $R^{-1}$-C plane varies almost linearly with slight inclination. FIG. 4 exaggerates the inclination for easy understanding. From the result of FIG. 4, the following equation (7) holds:

$$\frac{\Delta(Z(j\omega)^{-1})C \text{ component}}{\Delta(Z(j\omega)^{-1})R^{-1} \text{component}} = k \quad \text{(Eq. 7)}$$

The denominator and the numerator on the left side in the equation (7) represent an increment of 1/R and that of C, respectively, and k on the right side represents the inclination of the characteristic of the composite admittance $Z(j\omega)^{-1}$ shown in FIG. 4. Therefore, with respect to plasma of any given intensity, the following equation (8) holds:

$$\frac{Cp}{Rp^{-1}} = Rp \cdot Cp = k \quad \text{(Eq. 8)}$$

The equation (8) is a model equation representing the characteristics of the plasma admittance $Zp(j\omega)^{-1}$, in other words, a model equation representing a relation between the resistance component Rp and the static capacitance component Cp which are included in the plasma impedance $Zp(j\omega)$. In Step s3, the static capacitance component Cg is obtained by using the model equation. The value of the parameter k is stored in the signal processing portion 24 in advance. As the result of analysis, in machining the work 50 with the laser beam having a frequency of 1 MHz, the value of k ranges from $10^{-9}$ ΩF to $10^{-8}$ ΩF. The value of the parameter k used in Step s3 is set not smaller than $10^{-9}$ ΩF and not larger than $10^{-8}$ ΩF.

Figure 5:
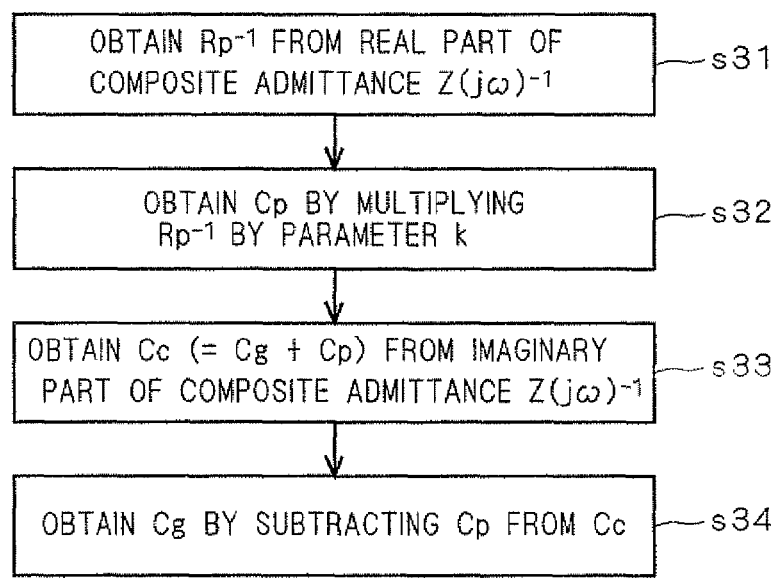
FIG. 5 is a flowchart showing the gap detection method in accordance with the first preferred embodiment of the present invention.

FIG. 5 is a flowchart showing the operation of Step s3 in detail. As shown in FIG. 5, first in Step s31, the signal processing portion 24 obtains the reciprocal $Rp^{-1}$ of the resistance component Rp from the real part of the composite admittance $Z(j\omega)^{-1}$ which is obtained in Step s2. Then, in Step s32, the signal processing portion 24 obtains the static capacitance component Cp by multiplying the reciprocal $Rp^{-1}$ which is obtained in Step s31 by the value of the parameter k which is stored in advance. Though the resistance component Rp is obtained as a form of the reciprocal in Step s31, there may be a case where the resistance component Rp is obtained itself and the static capacitance component Cp is obtained in Step 32 by dividing the value of the parameter k by the resistance component Rp.

Next in Step s33, the signal processing portion 24 obtains composite static capacitance Cc(=Cg+Cp) which is the sum of the gap static capacitance Cg and the static capacitance component Cp from the imaginary part of the composite admittance $Z(j\omega)^{-1}$. Then, in Step s34, the signal processing portion 24 obtains the gap static capacitance Cg by subtracting the static capacitance component Cp from the composite static capacitance Cc.

Thus, the signal processing portion 24 serves as a resistance component acquisition portion for obtaining the resistance component Rp and also serves as a static capacitance component acquisition portion for obtaining the static capacitance component Cp. The signal processing portion 24 further serves as a composite static capacitance acquisition portion for obtaining the composite static capacitance Cc and also serves as a gap static capacitance acquisition portion for obtaining the gap static capacitance Cg.

In this preferred embodiment, though the model equation (8) is used as a model representing the characteristics of the plasma admittance $Zp(j\omega)^{-1}$, a look-up table showing a correspondence between the resistance component Rp and the static capacitance component Cp which are acquired by an experiment in advance may be used. In this case, the signal processing portion 24 stores the look-up table in advance and acquires the static capacitance component Cp corresponding to the resistance component Rp which is obtained in Step s31 from the look-up table.

Referring to FIG. 3, after the gap static capacitance Cg is obtained in Step s3, the signal processing portion 24 generates a detection gap signal Vd representing the value of the gap d from the gap static capacitance Cg in Step s4. Since the correspondence between the gap static capacitance Cg and the gap d depends on the shape of the machining head 6, the shape of the nozzle 4, the length of the concentric cable 25 or the like, it is necessary to acquire this correspondence by an experiment in advance. Then a look-up table showing the correspondence which is acquired is made and stored in the signal processing portion 24 in advance. The signal processing portion 24 refers to the look-up table to acquire the value of the gap d corresponding to the gap static capacitance Cg which is obtained in Step s3 and outputs the detection gap signal Vd representing the value. Alternatively, there may be a case where an approximate curve equation indicating the correspondence is made in advance and the signal processing portion 24 substitutes the value of the gap static capacitance Cg which is obtained Step s3 into the approximate curve equation to obtain the value of the gap d.

The detection gap signal Vd outputted from the signal processing portion 24 is inputted to the machine controller 3 of the laser beam machine 1 through a not-shown cable. The machine controller 3 controls the machining head 6 on the basis of the detection gap signal Vd so that the gap d between the nozzle 4 and the work 50 should be an appropriate value.

Thus, in the first preferred embodiment, in consideration of not only the resistance component Rp included in the plasma impedance Zp but also the static capacitance component Cp included therein, the gap d between the nozzle 4 and the work 50 is obtained.

On the other hand, since the above-discussed technique of Japanese Patent Application Laid-Open No. 2000-234903 considers only the resistance component Rp, the static capacitance component Cp is included in the gap static capacitance Cg which is obtained. For this reason, the effect of the plasma generated during the laser beam machining on detection of the gap d can not be sufficiently eliminated and the gap d can not be detected with high accuracy.

In the first preferred embodiment, since the gap d is obtained also in consideration of the static capacitance component Cp, the effect of the plasma generated during the laser beam machining on detection of the gap d can be suppressed. It is therefore possible to detect the gap d with high accuracy.

Further, in the first preferred embodiment, the model equation (8) is used as a model representing the relation between the resistance component Rp and the static capacitance component Cp. Since this model equation simply and accurately expresses the relation between the resistance component Rp and the static capacitance component Cp, it is possible to easily and accurately obtain the static capacitance component Cp. Further, the function to obtain the static capacitance component Cp can be easily contained in the gap detection device 20.

Furthermore, as discussed above, also by using the look-up table representing the correspondence between the resistance component Rp and the static capacitance component Cp as a model representing the relation between the resistance component Rp and the static capacitance component Cp, the static capacitance component Cp can be easily and accurately obtained and the function to obtain the static capacitance component Cp can be easily contained in the gap detection device 20.

In the first preferred embodiment, the composite admittance $Z(j\omega)^{-1}$ is obtained by using the frequency transfer function $F(j\omega)$ expressed by the equation (2). Since the frequency transfer function $F(j\omega)$ of the equation (2) simply and accurately expresses the transfer function from the input signal Vin to the output signal Vout, it is possible to easily and accurately obtain the composite admittance $Z(j\omega)^{-1}$. Further, the function to obtain the composite admittance $Z(j\omega)^{-1}$ can be easily contained in the gap detection device 20.

The Second Preferred Embodiment

Figure 6:
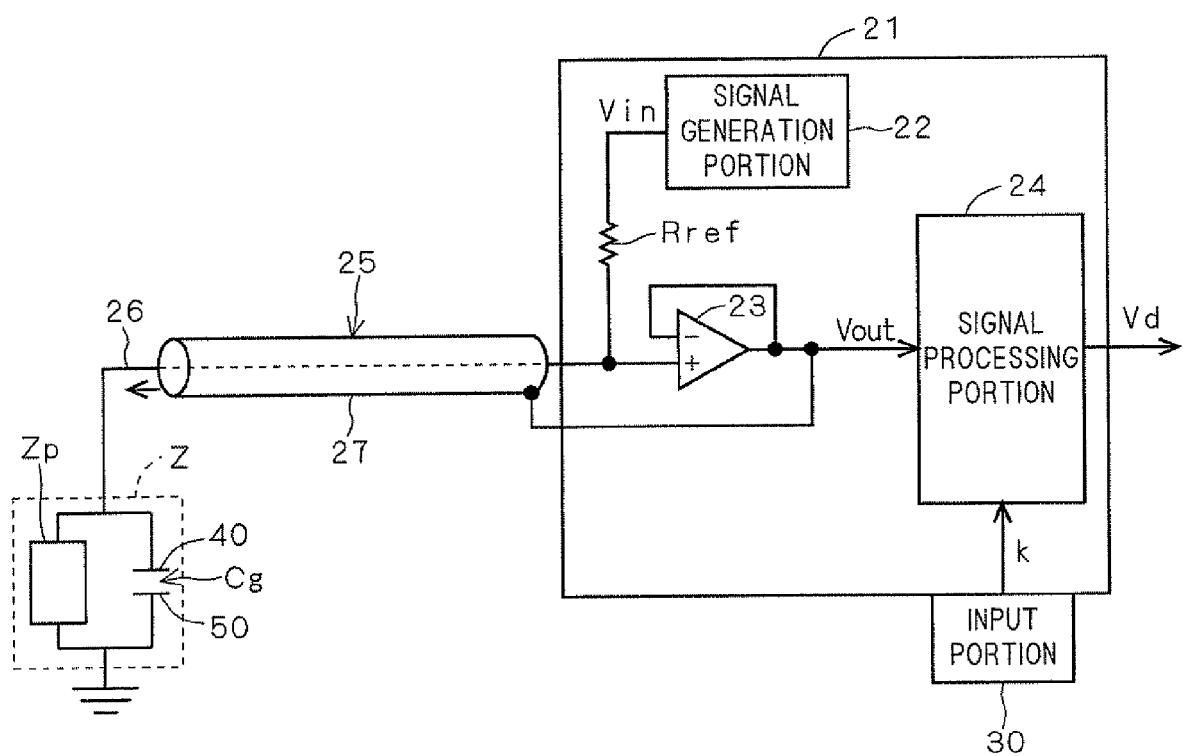
FIG. 6 is a view showing a constitution of a gap detection device in accordance with a second preferred embodiment of the present invention.

FIG. 6 is a view showing a constitution of a gap detection device 20 in accordance with the second preferred embodiment of the present invention. The gap detection device 20 of the second preferred embodiment further comprises an input portion 30 for inputting a value of the parameter k in the above-discussed gap detection device 20 of the first preferred embodiment.

The input portion 30 has an operation portion including e.g., an operation button and the like, and a user can input a value of the parameter k to the gap detection device body 21 by manipulating the operation portion. The value of the parameter k inputted to the input portion 30 is inputted to the signal processing portion 24. The signal processing portion 24 replaces the value of the parameter k which is stored in advance with the inputted value and uses the inputted value in the following detection of the gap d. Since other constituent elements are identical to those of the gap detection device 20 of the first preferred embodiment, description thereof will be omitted.

In general, the characteristics of the plasma generated during the laser beam machining depend on the machining conditions such as the value of the gap d set in the laser beam machine 1, the material and thickness of the work 50 and machining gas which is actually used. Therefore, depending on the machining conditions, the characteristic of the plasma admittance $Zp^{-1}$ shown in FIG. 4 varies and the inclination of the characteristic varies. It is found, as the result of actual use of the laser beam machining system of the first preferred embodiment, that the value of the inclination of the characteristic varies, especially, depending on the value of the gap d which is set. In the gap detection device 20 of the second preferred embodiment, since the value of the parameter k can be inputted from the outside, it is possible to easily change the value of the parameter k in accordance with the machining conditions. As a result, it is possible to detect the gap d with higher accuracy.

Figure 7:
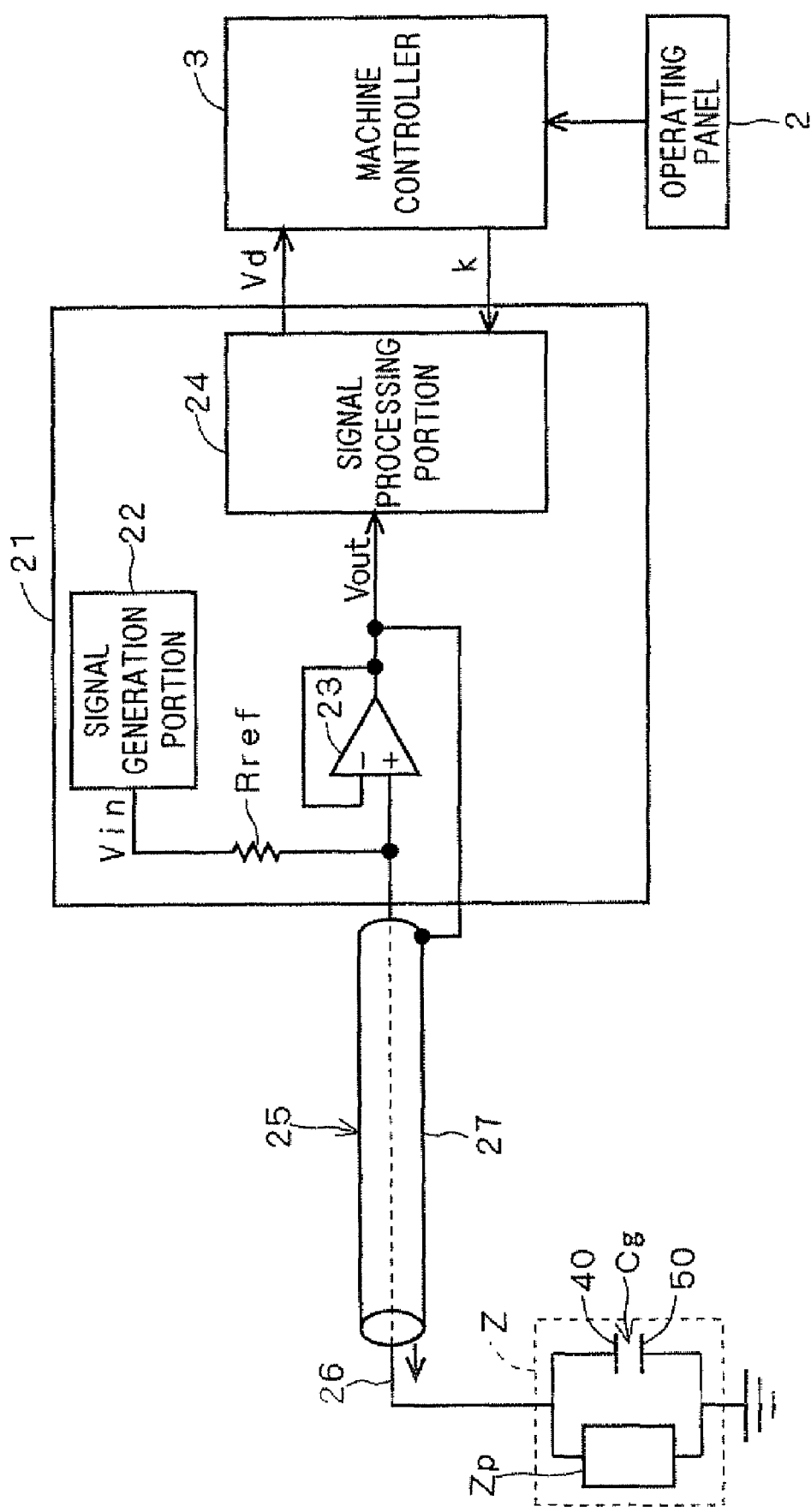
FIG. 7 is a view showing a variation of the gap detection device in accordance with the second preferred embodiment of the present invention.

Though the value of the parameter k is directly inputted to the gap detection device 20 from the outside in the second preferred embodiment, the value of the parameter k may be inputted from the laser beam machine 1 to the gap detection device 20. FIG. 7 is a view showing a constitution of the laser beam machining system in such a case. As shown in FIG. 7, the machine controller 3 of the laser beam machine 1 inputs a value of the parameter k to the signal processing portion 24 of the gap detection device 20. The user can input a value of the parameter k to the machine controller 3 by manipulating the operating panel 2, and the machine controller 3 outputs the inputted value of the parameter k to the signal processing portion 24.

Thus, by inputting a value of the parameter k to the gap detection device 20 from the side of the laser beam machine 1, it becomes easier to input the value of the parameter k in accordance with the machining conditions.

Though the value of the parameter k is inputted by the user in the above-discussed case, the machine controller 3 may automatically determine a value of the parameter k on the basis of the machining conditions inputted through the operating panel 2. By storing a look-up table representing the correspondence between the machining condition and the parameter k in the machine controller 3 in advance, the machine controller 3 can determine a value of the parameter k in accordance with an inputted machining condition.

The Third Preferred Embodiment

FIG. 8 is a view showing a constitution of a gap detection device 20 in accordance with the third preferred embodiment of the present invention. The gap detection device 20 of the third preferred embodiment further comprises a jumper pin 31 and a jumper block 32 in the above-discussed gap detection device 20 of the first preferred embodiment.

The jumper pin 31 can cause a short circuit at both ends of the reference resistance Rref. When the jumper block 32 is attached to the jumper pin 31, a short circuit is caused at both the ends of the reference resistance Rref. Then, the input signal Vin is directly inputted to the buffer circuit 23. Accordingly, the output signal Vout of the buffer circuit 23 is equal to the input signal Vin and the signal processing portion 24 can directly observe the input signal Vin. Since other constituent elements are identical to those of the first preferred embodiment, description thereof will be omitted.

Though the input signal Vin is originally known, sometimes there arises variation in the input signal Vin among a plurality of gap detection devices 20. When the signal generation portion 22 is formed of an analog element, particularly, it is likely to cause variation in the input signal Vin due to individual differences in characteristics of the analog elements.

Since the gap detection device 20 of the third preferred embodiment is provided with the jumper pin 31 which can cause a short circuit at both ends of the reference resistance Rref, the signal processing portion 24 can directly observe the input signal Vin. Therefore, even if there is variation in the input signal Vin, it is possible to store accurate information on the input signal Vin in the signal processing portion 24. Further, using the observation result on the input signal Vin by the signal processing portion 24 allows an easy adjustment of the gap detection device 20 at factory shipment.

The Fourth Preferred Embodiment

Figure 9:
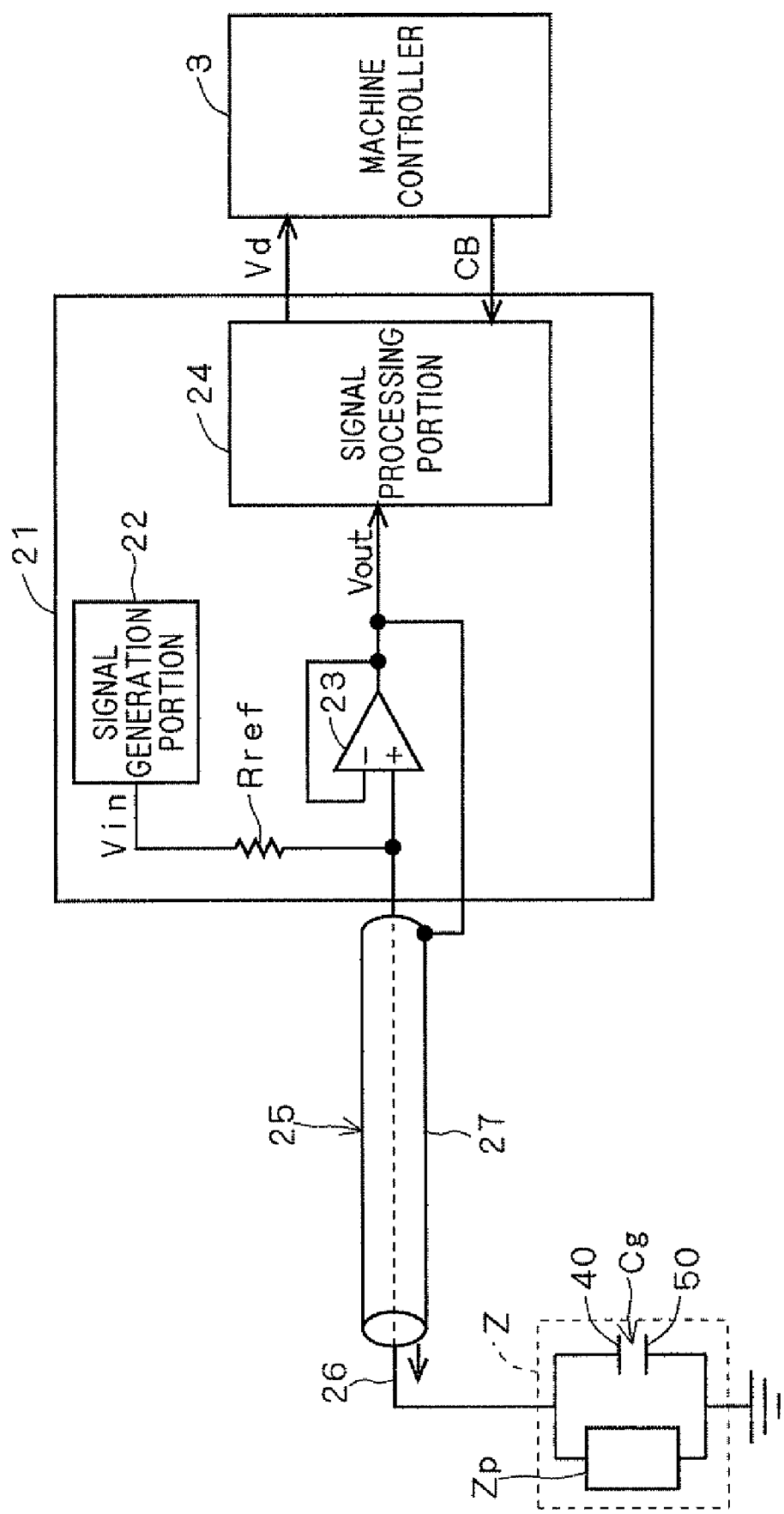
FIG. 9 is a view showing a constitution of a gap detection device in accordance with a fourth preferred embodiment of the present invention.

FIG. 9 is a view showing a constitution of a laser beam machining system in accordance with the fourth preferred embodiment of the present invention. The laser beam machining system of the fourth preferred embodiment further has a calibration function to update values of the parameters $A(j\omega)$ and $X(j\omega)$ in the above-discussed laser beam machining system of the first preferred embodiment.

The machine controller 3 of the fourth preferred embodiment is brought into a calibration mode when it receives notification of calibration to be performed, from a user every a predetermined time or through the operating panel 2. The machine controller 3 in the calibration mode outputs a calibration signal CB to the gap detection device body 21 as shown in FIG. 9. The calibration signal CB is inputted to the signal processing portion 24.

Figure 10:
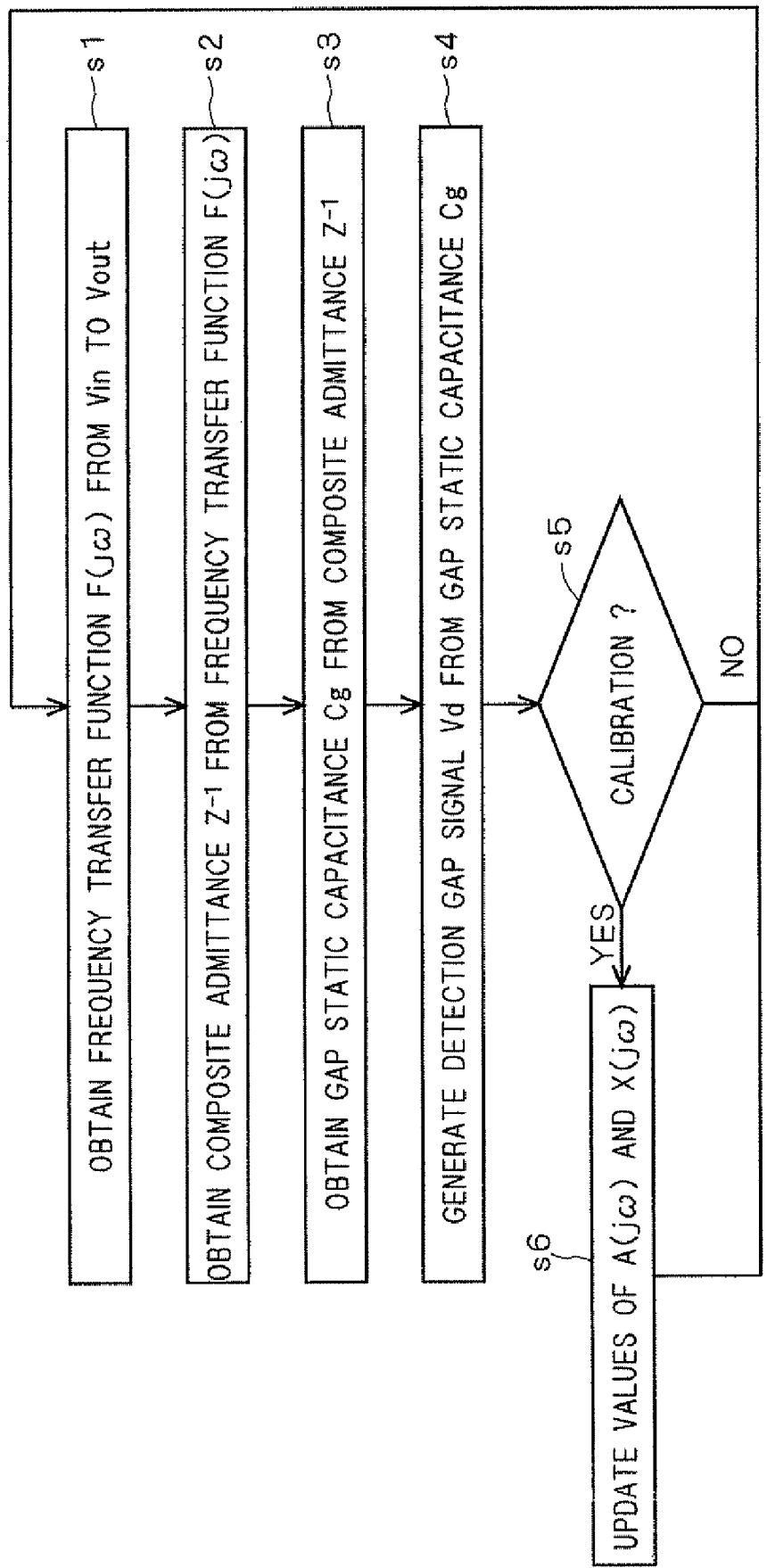
FIG. 10 is a flowchart showing an operation of a signal processing portion in accordance with the fourth preferred embodiment of the present invention.

FIG. 10 is a flowchart showing an operation of the signal processing portion 24 in accordance with the fourth preferred embodiment. As shown in FIG. 10, after Steps s1 to s4 are performed, when the calibration signal CB is inputted in Step s5, the signal processing portion 24 updates values of the parameters $A(j\omega)$ and $X(j\omega)$ in Step s6. In other words, the signal processing portion 24 serves as a parameter update portion for updating values of the parameters $A(j\omega)$ and $X(j\omega)$.

Figure 11:
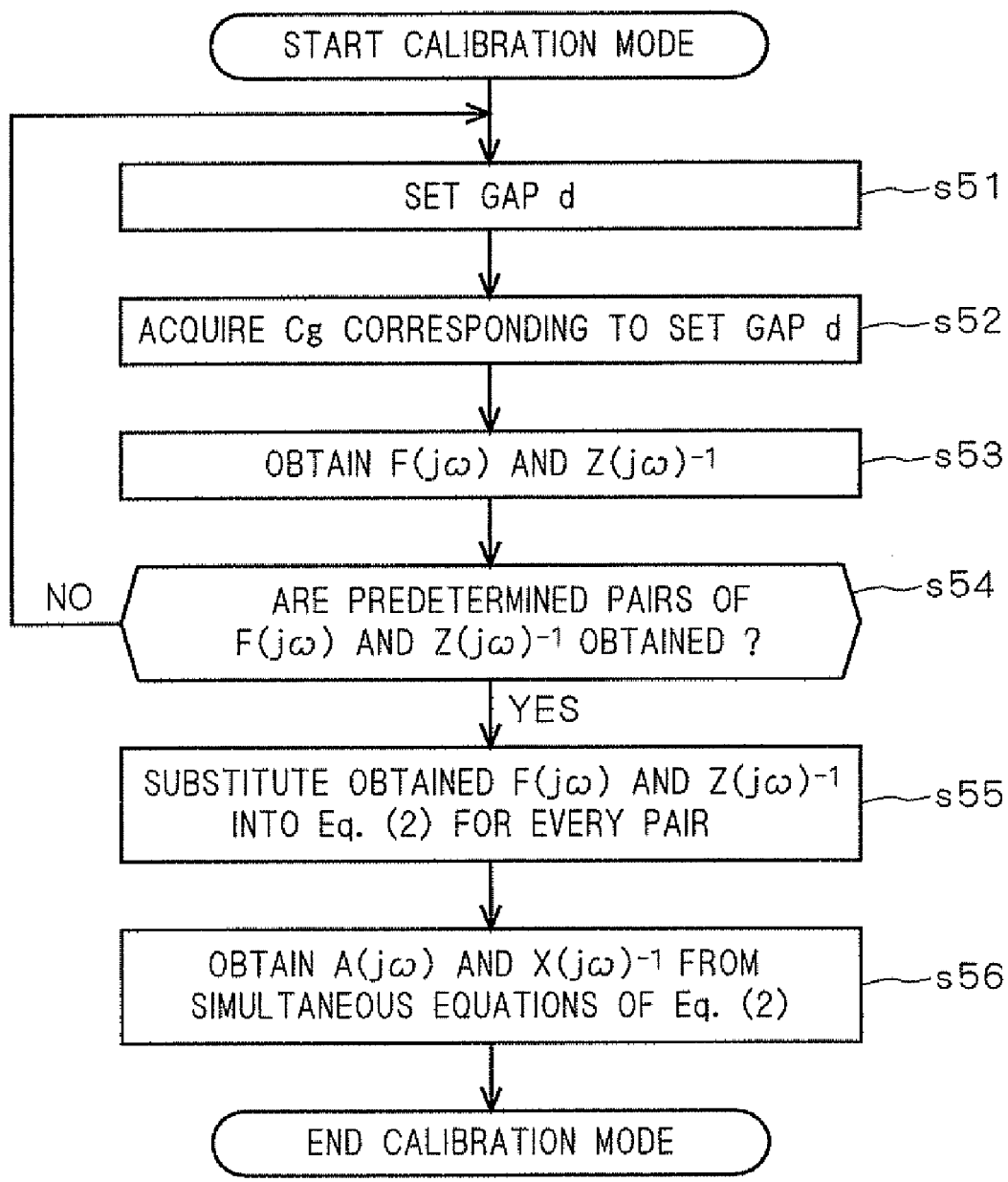
FIG. 11 is a flowchart showing a calibration operation of a laser beam machining system in accordance with the fourth preferred embodiment of the present invention.

FIG. 11 is a flowchart showing a calibration operation in the entire laser beam machining system of the fourth preferred embodiment. As shown in FIG. 11, when the calibration mode starts, the machine controller 3 controls the machining head 6 to set the gap d between the nozzle 4 and the work 50 at a predetermined value in Step s51. Then, the machine controller 3 outputs a signal indicating the set value of the gap d, together with the calibration signal CB, to the gap detection device 20.

When the calibration signal CB is inputted to the gap detection device 20, the signal processing portion 24 acquires the gap static capacitance Cg in accordance with the value of the gap d which is notified by the machine controller 3 in Step s52. Since the signal processing portion 24 stores the look-up table representing the correspondence between the gap d and the gap static capacitance Cg as discussed above, by referring to the look-up table, the gap static capacitance Cg corresponding to the gap d which is set in Step s51 can be acquired.

Next in Step s53, the signal processing portion 24 observes the output signal Vout and obtains the frequency transfer function $F(j\omega)$ from the input signal Vin to the output signal Vout, like in Step s1. The signal processing portion 24 further obtains the composite admittance $Z(j\omega)^{-1}$ by using the above equation (5). In the calibration mode, since the nozzle 4 outputs no laser beam, there is no plasma generated between the nozzle 4 and the work 50. Therefore, it can be thought that the resistance component Rp is infinite and the static capacitance component Cp is zero. Accordingly, the composite admittance $Z(j\omega)^{-1}$ in the calibration mode is equal to $j\omega Cg$. The signal processing portion 24 substitutes zero into $Rp^{-1}$ and Cp and the acquired value into Cg in the equation (5), to obtain the composite admittance $Z(j\omega)^{-1}$. Then, the signal processing portion 24 stores the value of the frequency transfer function $F(j\omega)$ and the value of the composite admittance $Z(j\omega)^{-1}$ which are obtained, in pairs.

Next in Step s54, the signal processing portion 24 judges if a predetermined pairs of the values of $F(j\omega)$ and $Z(j\omega)^{-1}$ are obtained. If it is judged in Step s54 that a predetermined pairs of the values of $F(j\omega)$ and $Z(j\omega)^{-1}$ are obtained, Step s55 is executed.

On the other hand, if it is judged in Step s54 that a predetermined pairs of the values of $F(j\omega)$ and $Z(j\omega)^{-1}$ are not obtained, the signal processing portion 24 notifies the machine controller 3 of that. When the machine controller 3 receives the notification, the machine controller 3 executes the Step s51 again. In this Step s51, the gap d is set at a value different from the value set in the previously-executed Step s51. Then, the machine controller 3 notifies the gap detection device 20 of the newly-set value of the gap d. After that, the signal processing portion 24 in the gap detection device 20 executes Step s52 again, to acquire the gap static capacitance Cg in accordance with the newly-set value of the gap do Then, the signal processing portion 24 executes Step s53 again, to obtain a new pair of the values of $F(j\omega)$ and $Z(j\omega)^{-1}$.

In Step s55, the signal processing portion 24 substitutes the values of $F(j\omega)$ and $Z(j\omega)^{-1}$ which are obtained in Step s53 into the above equation (2) for every pair. With this operation, a plurality of equations (2), into which different pairs of values of $F(j\omega)$ and $Z(j\omega)^{-1}$ are substituted and which each include unknown $A(j\omega)$ and $X(j\omega)^{-1}$, are obtained. Then, in Step s56, the signal processing portion 24 uses a plurality of equations (2) obtained in Step s55 as simultaneous equations and obtains values of $A(j\omega)$ and $X(j\omega)^{-1}$ from the simultaneous equations, for example, by using the least squares method. In this case, in order to obtain two unknown values of $A(j\omega)$ and $X(j\omega)^{-1}$, the simultaneous equations have to include at least two equations (2). Therefore, in Step s53, at least two pairs of values of $F(j\omega)$ and $Z(j\omega)^{-1}$ have to be obtained.

After the values of $A(j\omega)$ and $X(j\omega)^{-1}$ are obtained, the signal processing portion 24 notifies the machine controller 3 of that, and this puts an end to the calibration mode. In detecting the gap d, the signal processing portion 24 uses the values of $A(j\omega)$ and $X(j\omega)^{-1}$ which are obtained in the calibration mode, for the above-discussed operation in Step s2.

Thus, since the gap detection device 20 of the fourth preferred embodiment updates the values of parameters $A(j\omega)$ and $X(j\omega)$ when the calibration signal CB is inputted, it is possible to surely suppress the effect of the plasma generated during the laser beam machining on detection of the gap d even if there is a change in temperature or variation with time in the system, and it is therefore possible to detect the gap d with high accuracy.

The parameters $Vin(j\omega)$ and $A(j\omega)$ may be regarded as one parameter $B(j\omega)$. In such a case, the above equation (1) is transformed as follows:

$$Vout(j\omega) = \frac{B(j\omega)}{1 + Rref(Z(j\omega)^{-1} + X(j\omega)^{-1})} \quad \text{(Eq. 9)}$$

The signal processing portion 24 acquires a plurality of pairs of values of the output signal $Vout(j\omega)$ and the composite admittance $Z(j\omega)^{-1}$, instead of acquiring a plurality of pairs of values of $F(j\omega)$ and $Z(j\omega)^{-1}$, in the calibration mode. Then, the signal processing portion 24 uses the above equation (9) to obtain the values of $B(j\omega)$ and $X(j\omega)^{-1}$. When the calibration mode is ended, the signal processing portion 24 uses the obtained values of $B(j\omega)$ and $X(j\omega)^{-1}$ and the equation (9), to obtain the composite admittance $Z(j\omega)^{-1}$.

Thus, since the composite admittance $Z(j\omega)^{-1}$ is obtained by using the equation (9), the information on the input signal Vin is not needed. By updating the values of the parameters $B(j\omega)$ and $X(j\omega)$, the composite admittance $Z(j\omega)^{-1}$ can be obtained accurately even if the input signal Vin varies, and the gap d can be detected with high accuracy. Further, even if there is a change in temperature or variation with time in the system, it is possible to surely suppress the effect of the plasma generated during the laser beam machining on detection of the gap d and detect the gap d with high accuracy.

The Fifth Preferred Embodiment

In the fifth preferred embodiment, one exemplary method of obtaining the frequency transfer function $F(j\omega)$ in Step s1 will be discussed. In the fifth preferred embodiment, the frequency transfer function $F(j\omega)$ is obtained by using a time-series model equation representing a relation between the input signal Vin and the output signal Vout. The detailed discussion will be made below.

In the fifth preferred embodiment, an input signal Vin of trigonometric function wave is used and its frequency is assumed to be f(Hz). The signal processing portion 24 samples the output signal Vout with the quadruple of the frequency f of the input signal Vin, i.e., 4 f. One of advantages of such quadruple-oversampling is that the frequency transfer function $F(j\omega)$ can be obtained easily from the time-series data when the input signal Vin of trigonometric function wave is in a stationary state.

Assuming that the k-th sampling data u of the input signal Vin is $u_k$ and the k-th sampling data y of the output signal Vout is $y_k$, when the system is in a stationary state, the time-series model equation representing the relation between the input signal Vin and the output signal Vout is expressed by the equation (10) using time-series data:

$$y_k = a_0 u_k + a_1 u_{k-1} \quad \text{(Eq. 10)}$$

By using coefficients $a_0$ and $a_1$ of the equation (10), the frequency transfer function $F(j\omega)$ is expressed as the following equation (11):

$$F(j\omega) = a_0 - j a_1 \quad \text{(Eq. 11)}$$

where $\omega = 2\pi f$.

In the signal processing portion 24, the sampling data u of the input signal Vin which is obtained by sampling the input signal Vin with the sampling frequency of 4 f is stored in advance. As a method of acquiring the sampling data u of the input signal Vin, for example, the above-discussed gap detection device 20 shown in FIG. 8 is used to allow the signal processing portion 24 to directly observe the input signal Vin and the signal processing portion 24 samples the output signal Vout with the sampling frequency of 4 f, to consequently obtain the sampling data u of the input signal Vin.

The signal processing portion 24 samples the output signal Vout with the sampling frequency of 4 f to obtain the sampling data y of the output signal Vout in Step s1. Then, the signal processing portion 24 substitutes the stored sampling data $u_k$ and $u_{k-1}$ and the acquired sampling data $y_k$ into the equation (10), to acquire the equation (10) with the coefficients $a_0$ and $a_1$ as unknowns. The signal processing portion 24 uses at least three sampling data u and at least two sampling data y to prepare at least two equations (10) with the coefficients $a_0$ and $a_1$ as unknowns, and uses the simultaneous equations consisting of at least two equations (10) to obtain values of the coefficients $a_0$ and $a_1$. The values of the coefficients $a_0$ and $a_1$ can be obtained by using, for example, the least squares method. After the values of the coefficients $a_0$ and $a_1$ are obtained, the signal processing portion 24 substitutes these values into the equation (11) to obtain the frequency transfer function $F(j\omega)$.

Assuming that there is an offset between the input signal Vin and the output signal Vout, however, the following equation (12) which includes a coefficient c, instead of the equation (10), may be used.

$$y_k = a_0 u_k + a_1 u_{k-1} + C \quad \text{(Eq. 12)}$$

In this case, by using at least four sampling data u and at least three sampling data y, at least three equations (10) with the coefficients $a_0$ and $a_1$ as unknowns are prepared, and by using the simultaneous equations consisting of at least three equations (10), the values of the coefficients $a_0$ and $a_1$ are obtained.

Thus, in the fifth preferred embodiment, since the frequency transfer function $F(j\omega)$ is obtained by using the time-series model equation representing the relation between the input signal Vin and the output signal Vout, it is possible to easily obtain the frequency transfer function $F(j\omega)$. In other words, the above-discussed operation of Step s1 can be easily performed by the gap detection device 20.

The Sixth Preferred Embodiment

In the sixth preferred embodiment, one exemplary method of obtaining the gap d in Step s4 will be discussed. In the sixth preferred embodiment, the gap d is obtained from the gap static capacitance Cg by using an exponential function model representing a relation between the gap d and the gap static capacitance Cg.

FIG. 12 is a graph showing a relation between the gap static capacitance Cg which is obtained by using the gap detection device 20 of the first preferred embodiment and an actual gap d. In FIG. 12, the horizontal axis represents a value of the gap static capacitance Cg which is obtained by the signal processing portion 24 and the vertical axis represents an actual value of the gap d as a logarithm. As shown in FIG. 12, the relation between the gap static capacitance Cg and the gap d approximates to the exponential function.

The signal processing portion 24 stores the exponential function equation representing the relation between the gap static capacitance Cg and the gap d or a look-up table representing the correspondence between the gap static capacitance Cg and the gap d in approximation of exponential function. The signal processing portion 24 uses the exponential function equation or the look-up table in Step s4, to obtain the gap d from the gap static capacitance Cg.

As can be seen from the graph of FIG. 12, the gap static capacitance Cg is zero when the gap d is about 0.8 mm and is a negative value when the gap d is larger than 0.8 mm. This is a result obtained when values of the above parameters $A(j\omega)$ and $X(j\omega)$ are determined in identification of a system to detect the gap d, with the value of the gap static capacitance Cg obtained when the gap d is set as 0.8 mm with a resistance element having a known resistance value inserted between the nozzle 4 and the work 50, as the reference (zero). In the graph of FIG. 12, the value of the gap static capacitance Cg is shown as the difference from the value obtained when the gap d is set at 0.8 mm. Thus, in the gap detection device 20, it is not always necessary to obtain an absolute value of the gap static capacitance Cg, but there may be a case where the difference from the value of the gap static capacitance Cg obtained when the gap d is set at a reference value is obtained.

Thus, in the sixth preferred embodiment, since the gap d is obtained from the gap static capacitance Cg by using the exponential function model representing the relation between the gap d and the gap static capacitance Cg, it is possible to easily obtain the gap d. In other words, the operation of Step s4 can be easily performed by the gap detection device 20.

As discussed in the first preferred embodiment, since the relation between the gap static capacitance Cg and the gap d depends on the shape of the machining head 6, the shape of the nozzle 4 or the like, when the relation can not sufficiently approximate to the exponential function, it may approximate to a polynomial. Alternatively, there may be a case where the range of the gap static capacitance Cg is divided into a plurality of sections and the plurality of sections may approximate differently. Further, like in the first preferred embodiment, the look-up table which directly represents the correspondence between the gap static capacitance Cg and the gap d may be used, instead of approximation.

While the invention has been shown and described in detail, the foregoing description is in all aspects illustrative and not restrictive. It is therefore understood that numerous modifications and variations can be devised without departing from the scope of the invention.

What is claimed is:

1. A gap detection device for laser beam machine, for detecting a gap between a nozzle of a laser beam machine for outputting a laser beam and an object to be machined by using the laser beam, comprising:
   a composite admittance acquisition portion for obtaining a composite admittance which is the reciprocal of a composite impedance of gap static capacitance depending on said gap and a plasma impedance depending on plasma generated during laser beam machining on said object;
   a composite static capacitance acquisition portion for obtaining composite static capacitance which is the sum of said gap static capacitance and a static capacitance component included in said plasma impedance from an imaginary part of said composite admittance;
   a resistance component acquisition portion for obtaining a resistance component included in said plasma impedance from a real part of said composite admittance;
   a static capacitance component acquisition portion for obtaining said static capacitance component by using a model representing a relation between said resistance component and said static capacitance component and said resistance component obtained by said resistance component acquisition portion;
   a gap static capacitance acquisition portion for obtaining said gap static capacitance by subtracting said static capacitance component from said composite static capacitance; and
   a gap acquisition portion for obtaining said gap from said gap static capacitance obtained by said gap static capacitance acquisition portion.

2. The gap detection device for laser beam machine according to claim 1, wherein
   said static capacitance component acquisition portion uses the following equation as said model;

$$Rp \cdot Cp = k$$

where Rp represents said resistance component, Cp represents said static capacitance component and k is a parameter.

3. The gap detection device for laser beam machine according to claim 2, wherein
   the value of said parameter k is set not smaller than $10^{-9}$ $\Omega$F and not larger than $10^{-8}$ $\Omega$F.

4. The gap detection device for laser beam machine according to claim 2, further comprising
   an input portion for inputting a value of said parameter k.

5. The gap detection device for laser beam machine according to claim 1, wherein said static capacitance component acquisition portion uses a look-up table showing a correspondence between said resistance component and said static capacitance component as said model.

6. The gap detection device for laser beam machine according to claim 1, further comprising:
a signal generation portion for generating an input signal to be inputted to a center electrode which forms said gap static capacitance between itself and said object through a reference resistance and outputting said input signal; and
a buffer circuit receiving a signal at one end of said reference resistance on the side of said center electrode, for outputting said signal to said static capacitance component acquisition portion,
wherein said static capacitance component acquisition portion obtains said composite admittance by using the following equation;

$$F(j\omega) = \frac{A(j\omega)}{1 + Rref(Z(j\omega)^{-1} + X(j\omega)^{-1})}$$

where j represents an imaginary unit, ω represents an angular frequency, Rref represents said reference resistance, F(jω) represents a frequency transfer function from said input signal to an output signal of said buffer circuit, $Z(j\omega)^{-1}$ represents said composite admittance and A(jω) and X(jω) are parameters.

7. The gap detection device for laser beam machine according to claim 6, further comprising
a jumper pin capable of causing a short circuit at both ends of said reference resistance.

8. The gap detection device for laser beam machine according to claim 6, further comprising
a parameter update portion for updating values of said parameters A(jω) and X(jω) when a predetermined signal is inputted.

9. The gap detection device for laser beam machine according to claim 6, wherein
said static capacitance component acquisition portion obtains said frequency transfer function F(jω) by using a time-series model equation representing a relation between said input signal and said output signal.

10. The gap detection device for laser beam machine according to claim 9, wherein
said static capacitance component acquisition portion uses sampling data which is obtained by sampling said input signal and said output signal with an integral multiple of the frequency of said input signal as time-series data to be substituted into said time-series model equation.

11. The gap detection device for laser beam machine according to claim 1, further comprising:
a signal generation portion for generating an input signal to be inputted to a center electrode which forms said gap static capacitance between itself and said object through a reference resistance and outputting said input signal; and
a buffer circuit receiving a signal at one end of said reference resistance on the side of said center electrode, for outputting said signal to said static capacitance component acquisition portion,
wherein said static capacitance component acquisition portion obtains said composite admittance by using the following equation;

$$Vout(j\omega) = \frac{B(j\omega)}{1 + Rref(Z(j\omega)^{-1} + X(j\omega)^{-1})}$$

where j represents an imaginary unit, ω represents an angular frequency, Rref represents said reference resistance, Vout(jω) represents an output signal of said buffer circuit, $Z(j\omega)^{-1}$ represents said composite admittance and B(jω) and X(jω) are parameters.

12. The gap detection device for laser beam machine according to claim 11, further comprising
a jumper pin capable of causing a short circuit at both ends of said reference resistance.

13. The gap detection device for laser beam machine according to claim 11, further comprising
a parameter update portion for updating values of said parameters B(jω) and X(jω) when a predetermined signal is inputted.

14. The gap detection device for laser beam machine according to claim 1, wherein
said gap acquisition portion obtains said gap from said gap static capacitance by using an exponential function model representing a relation between said gap and said gap static capacitance.

15. A laser beam machining system comprising:
a laser beam machine having a nozzle for outputting a laser beam; and
a gap detection device for detecting a gap between an object to be machined by using said laser beam and said nozzle,
wherein said gap detection device has
a composite admittance acquisition portion for obtaining a composite admittance which is the reciprocal of a composite impedance of gap static capacitance depending on said gap and a plasma impedance depending on plasma generated during laser beam machining on said object;
a composite static capacitance acquisition portion for obtaining composite static capacitance which is the sum of said gap static capacitance and a static capacitance component included in said plasma impedance from an imaginary part of said composite admittance;
a resistance component acquisition portion for obtaining a resistance component included in said plasma impedance from a real part of said composite admittance;
a static capacitance component acquisition portion for obtaining said static capacitance component by using a model representing a relation between said resistance component and said static capacitance component and said resistance component obtained by said resistance component acquisition portion;
a gap static capacitance acquisition portion for obtaining said gap static capacitance by subtracting said static capacitance component from said composite static capacitance; and
a gap acquisition portion for obtaining said gap from said gap static capacitance obtained by said gap static capacitance acquisition portion.

16. The laser beam machining system according to claim 15, wherein
said laser beam machine inputs a value of parameter used for obtaining said static capacitance component to said gap detection device, and
said static capacitance component acquisition portion uses the following equation as said model;

$Rp \cdot Cp = k$ where Rp represents said resistance component, Cp represents said static capacitance component and k is said parameter.

17. A gap detection method for laser beam machine to detect a gap between a nozzle of a laser beam machine for outputting a laser beam and an object to be machined by using the laser beam, comprising the steps of:
   (a) obtaining a composite admittance which is the reciprocal of a composite impedance of gap static capacitance depending on said gap and a plasma impedance depending on plasma generated during laser beam machining on said object;
   (b) obtaining composite static capacitance which is the sum of said gap static capacitance and a static capacitance component included in said plasma impedance from an imaginary part of said composite admittance;
   (c) obtaining a resistance component included in said plasma impedance from a real part of said composite admittance;
   (d) obtaining said static capacitance component by using a model representing a relation between said resistance component and said static capacitance component and said resistance component obtained in said step (c);
   (e) obtaining said gap static capacitance by subtracting said static capacitance component from said composite static capacitance; and
   (f) obtaining said gap from said gap static capacitance.

* * * * *